March 21, 1961 E. T. DUNCAN 2,976,370

TELEPHONE OPERATING DEVICE FOR HANDICAPPED PERSONS

Filed June 25, 1957 5 Sheets-Sheet 1

INVENTOR
Edward T. Duncan
BY
Wooster & Davis
ATTORNEYS.

TELEPHONE OPERATING DEVICE FOR HANDICAPPED PERSONS
Filed June 25, 1957 5 Sheets-Sheet 2
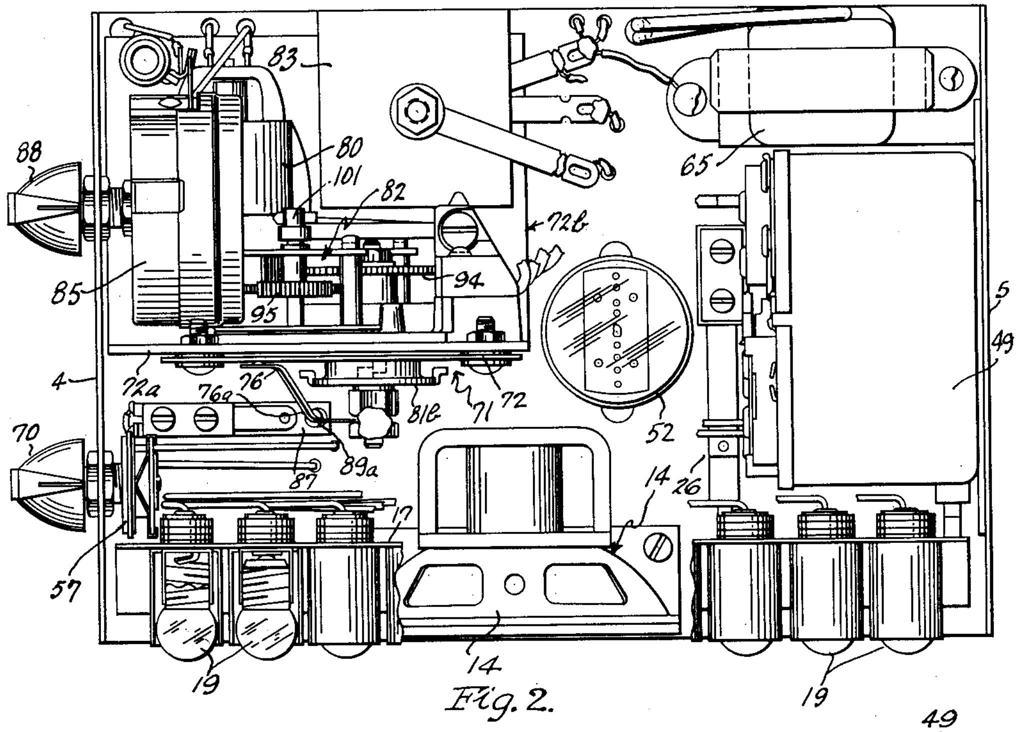
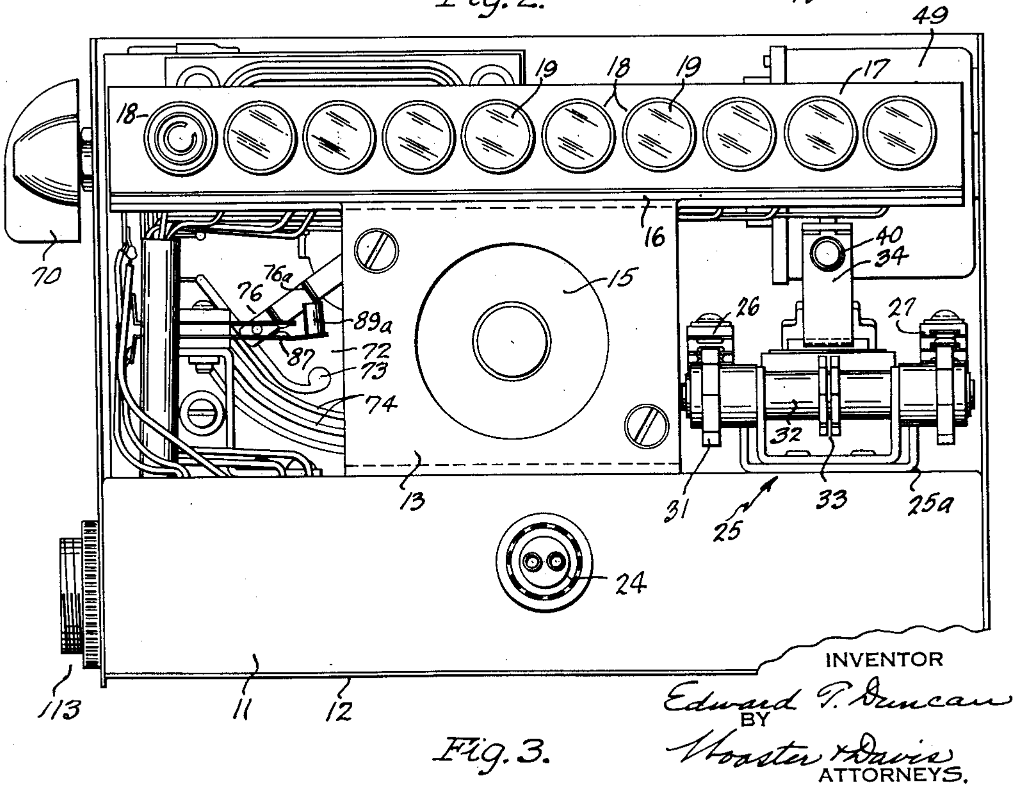
Fig. 3.
INVENTOR
Edward T. Duncan
BY
Wooster & Davis
ATTORNEYS.

March 21, 1961 E. T. DUNCAN 2,976,370

TELEPHONE OPERATING DEVICE FOR HANDICAPPED PERSONS

Filed June 25, 1957 5 Sheets-Sheet 3

INVENTOR
Edward T. Duncan
BY
Wooster & Davis
ATTORNEYS

March 21, 1961 E. T. DUNCAN 2,976,370

TELEPHONE OPERATING DEVICE FOR HANDICAPPED PERSONS

Filed June 25, 1957 5 Sheets-Sheet 4

INVENTOR
Edward T. Duncan
BY
Wooster & Davis
ATTORNEYS.

March 21, 1961 E. T. DUNCAN 2,976,370

TELEPHONE OPERATING DEVICE FOR HANDICAPPED PERSONS

Filed June 25, 1957 5 Sheets-Sheet 5

INVENTOR
Edward T. Duncan
BY
Wooster & Davis
ATTORNEYS.

United States Patent Office 2,976,370

Patented Mar. 21, 1961

2,976,370

TELEPHONE OPERATING DEVICE FOR HANDICAPPED PERSONS

Edward T. Duncan, Bridgeport, Conn., assignor to Harvey Hubbel, Incorporated, Bridgeport, Conn., a corporation of Connecticut Filed June 25, 1957, Ser. No. 667,761

6 Claims. (Cl. 179—90)

This invention relates to a telephone operating device for handicapped persons, and has for an object to provide a device whereby a handicapped person, such, for example, as a victim of polio, who can move only certain parts of the body a limited amount, may use a telephone both for receiving calls from other phones, or for dialing other phones for the purpose of calling other people.

A particular object is to provide a device of this character in which there is a switch controlled by the handicapped person which may connect this device comprising a transmitter and a receiver into a telephone line, and then by means controlled by another switch the operator may dial a number to be transmitted through the line to another phone, with visible means for indicating to the operator the number being dialed.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 2 is a top plan view with the outer casing removed;

Fig. 3 is a front view with the casing removed;

The device comprises in combination, a transmitter and a receiver with means for connecting them to a telephone line in the normal manner. It also includes a telephone dialing mechanism with a motor for operating this dialing mechanism, with means, specifically a series of electric lights, for indicatng the operaton of the dialing mechanism, and control switches operable by movable parts of the handicapped person's body, one for operating the necessary switch means for connecting the transmitter and receiver into a telephone line, and another for controlling the operation of the motor for the dialing mechanism.

Figures 1, 6, 7, 8, 9, 10:
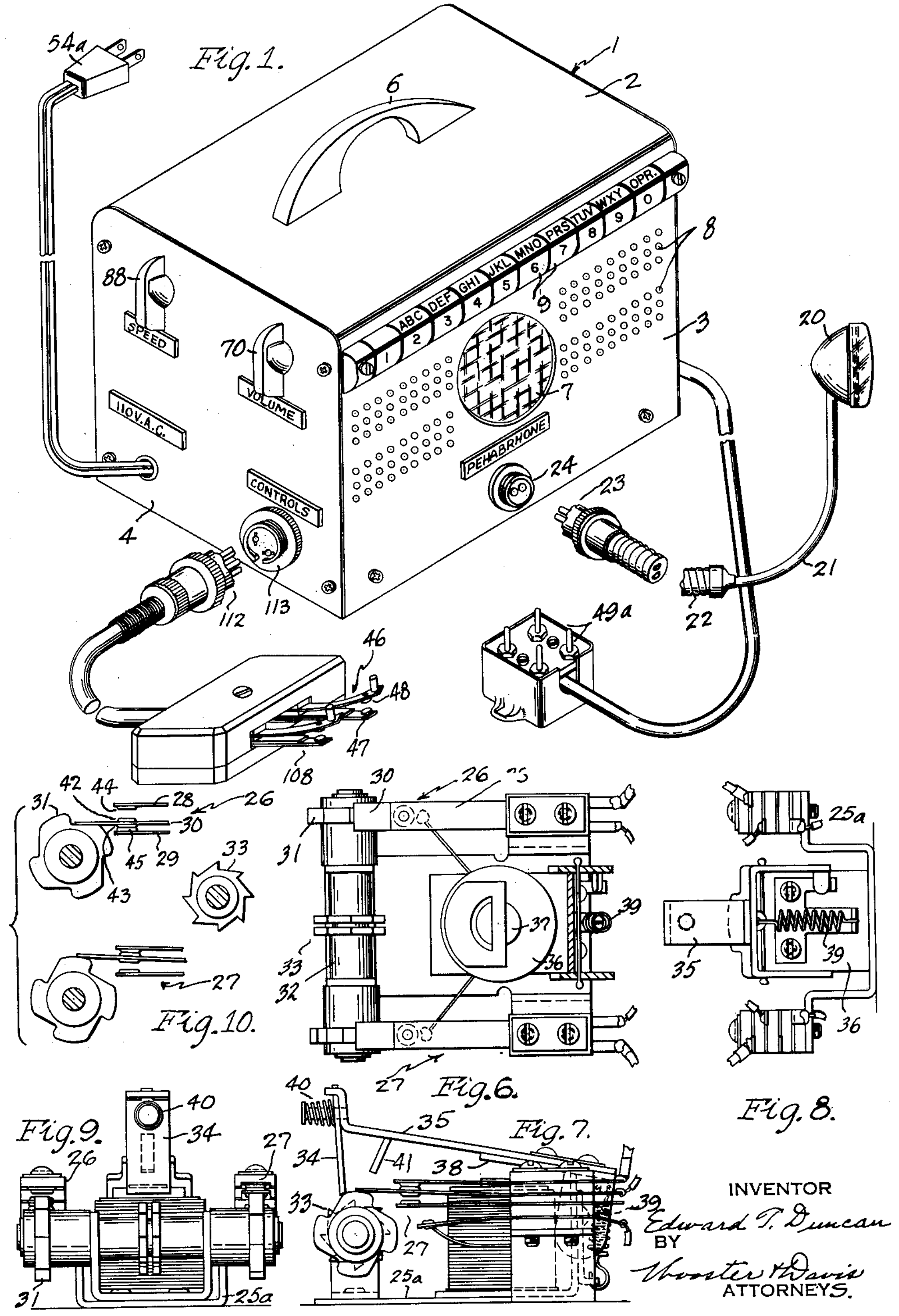
Fig. 1 is a perspective view of the device.
Fig. 6 is a plan view of one of the control relays.
Fig. 7 is a side view thereof looking toward the bottom of Fig. 6.
Fig. 8 is a view looking toward the right of Fig. 6.
Fig. 9 is an end view looking from the left of Fig. 6.
Fig. 10 is a detail of certain parts of the device of Fig. 6.
Figure 4:
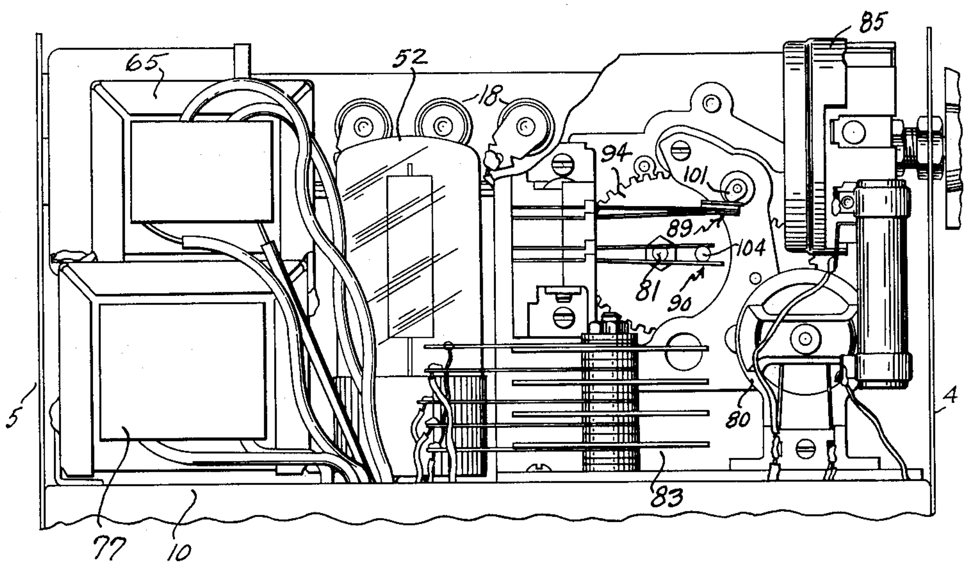
Fig. 4 is a rear view with the casing removed.
Figure 5:
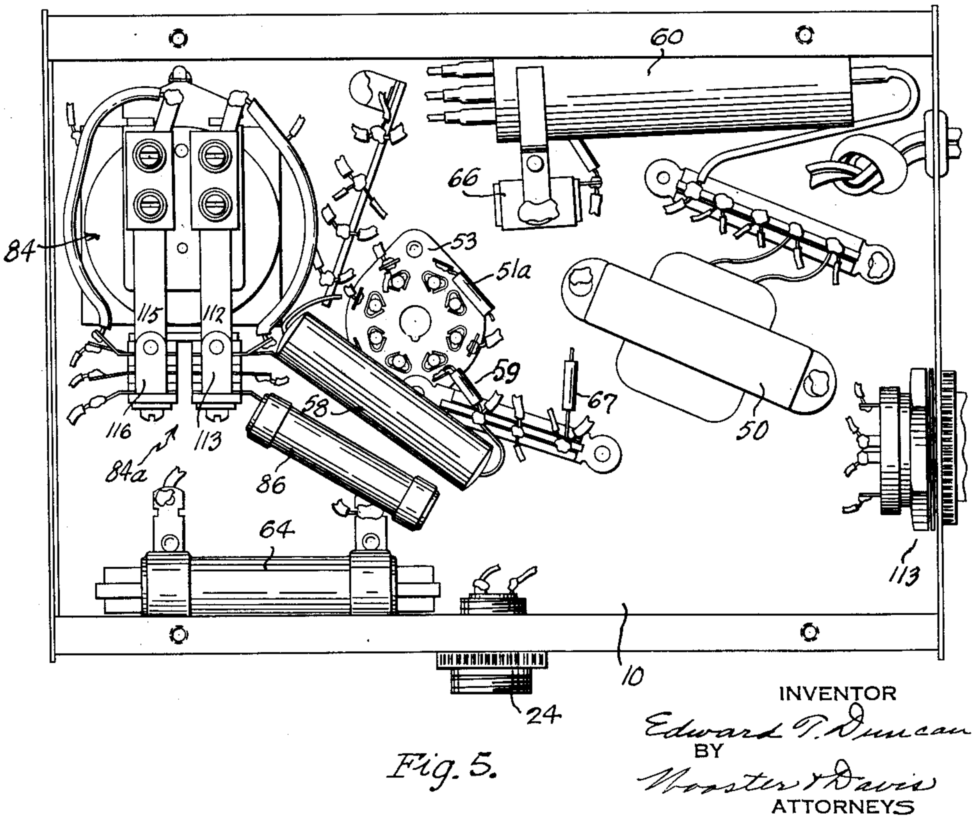
Fig. 5 is a bottom view with the lower plate removed.

The device as shown in Fig. 1 is enclosed in a casing 1 comprising a top wall 2, front wall 3, a rear wall (not shown) and end walls 4 and 5, with a suitable handle 6 on the top wall for carrying purposes. The front wall has an opening 7 in front of a loud speaker and ventilating openings 8 for circulation of air, and a row of lenses 9 numbered and lettered to correspond with the numbers and letters on a telephone dial. Within the casing spaced above the bottom thereof is a base plate 10 having downwardly extending walls 11 at the front and back whereby the plate 10 is spaced above the bottom of the housing casing 1. Various parts of the device are mounted on the top of the plate 10 and on the underside of this plate in the space formed by this plate and the end walls 11, this space being closed at the bottom by a bottom plate 12. The casing 1 comprising the walls 2, 3 and the rear wall is removable to permit access to the various parts supported on the plate 10, and the bottom wall 12 is removable to permit access to the parts mounted on the underside of this plate.

Mounted on the top of the plate 10 is a support for a loud speaker comprising an upright plate or bracket 13 carrying the loud speaker 14 mounted on the rear thereof, including the cone 15 in back of the opening 7 in the front wall of the casing. At the upper edge of plate 13 is a longitudinal horizontal strip 16 on which is mounted a strip 17 of insulating material carrying a series of sockets 18 for individual electric light bulbs 19, one of these bulbs being located behind each of the numbered and lettered lenses 9, whereby when the bulbs are lighted each will illuminate its respective lens. This loud speaker forms a telephone receiver for the unit which does not have to be held to the ear. A telephone transmitter for the unit is indicated at 20 and is mounted on an arm 21 including an adjustable section 22 so the transmitter may be adjusted to the most desirable position for the operator to speak into it when using this device. It is detachably connected to the unit through the plug-in connecting means 23 and 24.

A switch and relay 25 is mounted by bracket 25a on the plate 10 for connecting and disconnecting the transmitter and receiver to and from the telephone line corresponding with the operation of the telephone switch operated by the lifting or hanging up of the receiver and transmitter of the standard telephone. This is shown as comprising two switches 26 and 27, but in the present device only the switch 26 is used for connecting the receiver and transmitter to the telephone line. It comprises the upper and lower spring blade switch members 28 and 29 with an intermediate spring blade switch member 30 resting at its free end on a notched wheel 31 of insulating material, and which is also mounted on a transverse shaft 32 on which is a toothed ratchet 33 operated by a pawl 34 on a lever arm 35 operated by a coil and magnetic core 36, 37 of the relay, the armature 38 over the coil being on the arm 35. A spring 39 retains the arm 35 normally in its upper position. Pawl 34 is pivoted to the arm 35 and yieldingly held against the ratchet 33 during operation of the ratchet by a spring 40. A downwardly extending lug 41 on the lever 35 engages the ratchet 33 when operated by the pawl 34 to prevent its overrunning. The intermediate switch member 30 carries contacts 42 and 43 adapted to alternately engage contacts 44 and 45 on the spring blades 28 and 29 respectively under action of the toothed wheel 31. When engaging one of these switch members it connects the transmitter and receiver into the telephone line to correspond with lifting the transmitter and receiver in a standard telephone, and when in engagement with the other it disconnects the transmitter and receiver from the telephone line to correspond with the action of hanging up the transmitter and receiver in a standard telephone. This is operated by the control switch 46, which controls the relay 25. This switch, as shown, comprises a stationary contact 47 and a spring mounted contact 48, which by means of a spring mounting is normally separated from the contact 47. By depressing the contact 48 it operates the relay 25 to operate the ratchet 33 and the switch 26 to alternately connect the receiver and transmitter with the telephone line or disconnect it therefrom, through the telephone net 49.

Figure 23:
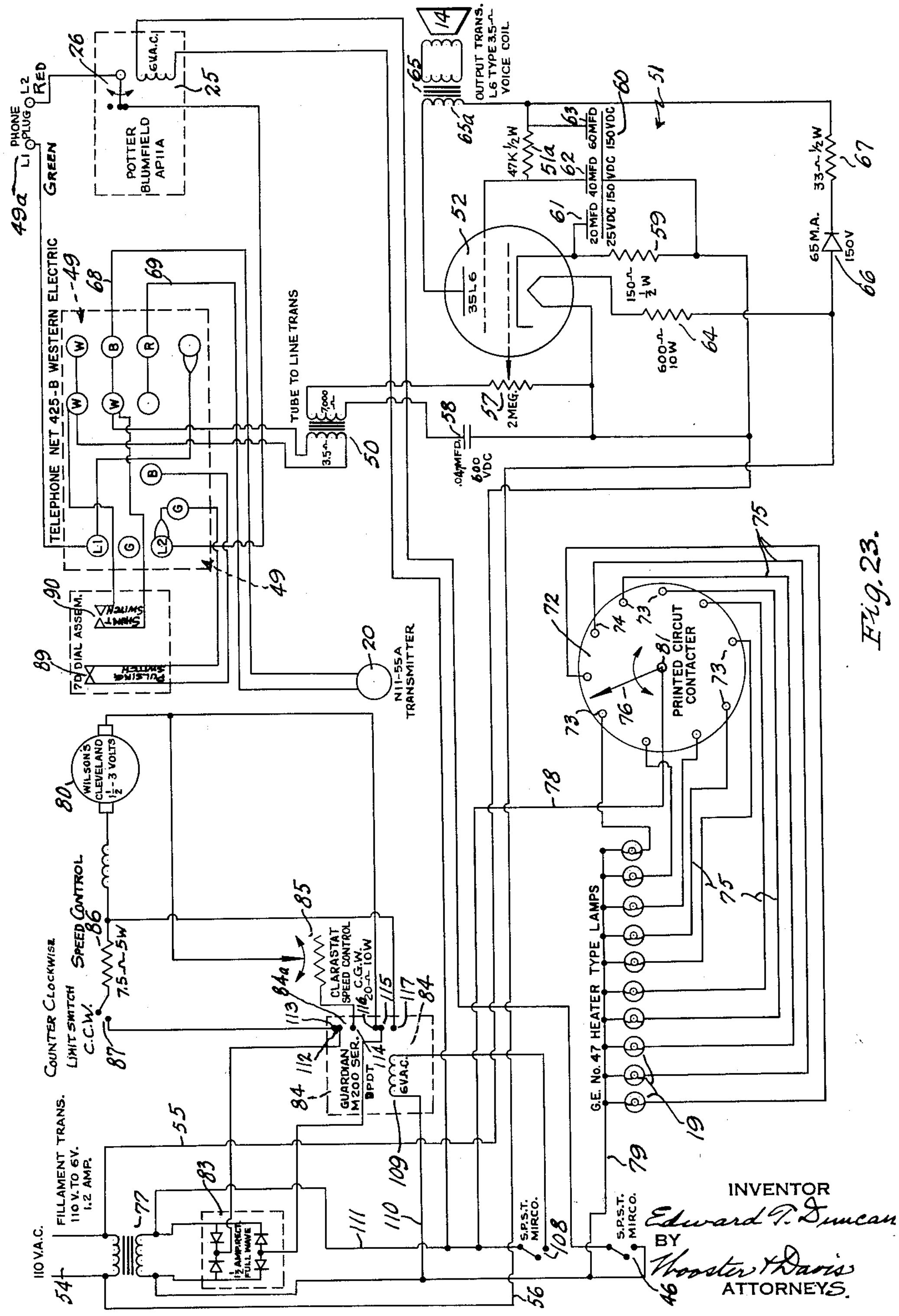
Fig. 23 is a wiring diagram of this operating device.

The loud speaker is connected to this telephone net by the tube-to-line transformer 50 and is operated through an amplifier 51 including the usual connections comprising the amplifier tube 52 mounted in the socket 53 on the plate 10 and connected to the standard 110 volt A.C. power supply 54 by the leads 55 and 56. The power supply 54 may be connected to this device through the plug 54*a* (Fig. 1) by plugging it into any convenient outlet receptacle in the house wiring system. The tube-to-line transformer 50 is connected to the amplifier through the volume control 57, condenser 58 and resistor 59, together with the condenser unit 60 including the three condensers 61, 62 and 63, as shown in Fig. 23. The filament of the tube is connected to the supply leads through the voltage drop resistor 64. The primary coil 65*a* of the output transformer 65 operating the speaker 14 of the receiver is connected to the plate of the tube and to the power supply through the half-wave selenium rectifier 66 and resistor 67. The telephone net 49 is connected to the telephone system through the relay switch 26 by means of the telephone plug 49*a*.

The transmitter 20 is connected to the telephone mechanism through the leads 68 and 69, and the detachable coupling 23, 24. The volume control 57 is adjustable by a suitable hand knob and pointer 70 accessible from the outside of the casing, as indicated in Fig. 1.

Figure 12:
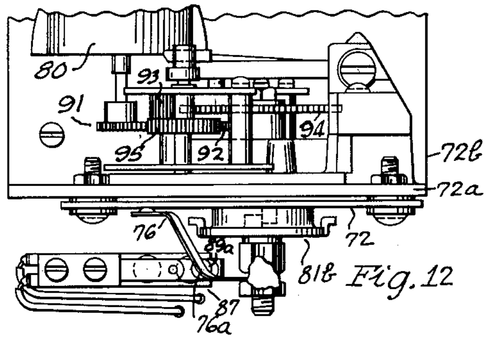
Fig. 12 is a top plan view thereof.
Figure 11:
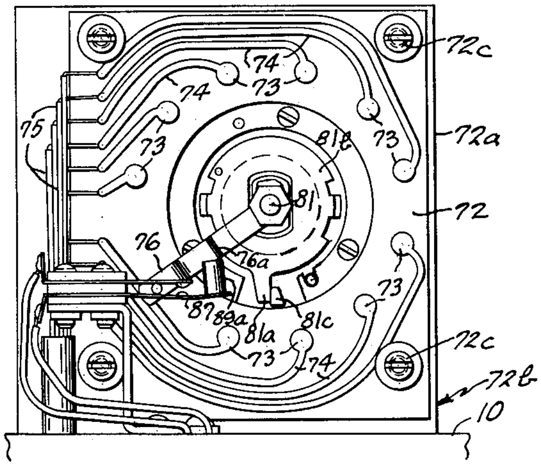
Fig. 11 is a front view of the dialing mechanism.
Figure 14:
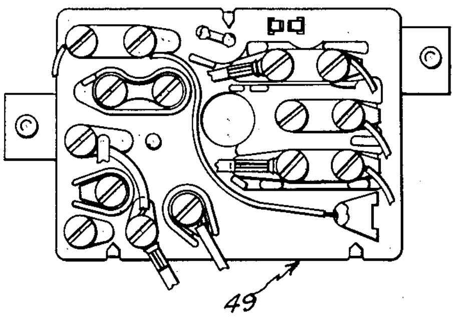
Fig. 14 is a front view of the telephone net or voice coil.

The dialing device for sending pulses through the telephone line in dialing and calling another phone is indicated at 71. This includes a dial plate 72 of insulating material on which is mounted a series of separated contacts 73, one for each of the lamp bulbs 19, and connected to the bulbs in succession, as indicated in Fig. 23, through the printed circuits 74 on the dial and the leads 75. Mounted at the front of this dial is a rotatable contact 76 normally to the left of the first contact 73, as shown in Fig. 23, and adapted to move over these contacts in succession during the dialing operation, this movable contact being connected to one side of the secondary of the filament or power transformer 77 through the lead 78, while the lamp bulbs 19 are connected to the other side of this secondary by the lead 79. The plate 72 is mounted by bolts 72*c* on the upright plate 72*a* of a bracket 72*b* mounted on the plate 10. The movable contact 76 is moved in succession over the contacts 73 to light the bulbs 19 in succession during the dialing operation by means of a direct current motor 80. This contact is mounted on a rotatable shaft 81 operated by the rotary armature of the motor through suitable reduction gearing 82. This motor is driven from the secondary of the power transformer 77 through a full wave rectifier 83, and is controlled by a relay 84 including a double-pole double-throw switch 84*a* through an adjustable speed control rheostat 85 on its forward movement, and a separate speed control resistance 86 on its reverse movement. Its reverse movement is limited by the limit switch 87, which is opened by the offset 76*a* (Fig. 12) in contact 76 engaging the top of lug 89*a* (Fig. 11) on the lower switch element and separating these elements when the contact 76 returns to its normal retracted position. Forward and reverse movements of the motor and contact 76 are also limited by a lug 81*a* (Fig. 11) on a plate 81*b* on shaft 81 and adapted to engage a stationary stop lug 81*c*. The speed control 85 controls the speed of the dialing operation and may be adjusted by a hand button and pointer 88 located on the outside wall of the casing. The motor operates, in unison with operation of the dialing contact 76, a pulsing switch 89 connected to the telephone net 49 for supplying to the telephone line a series of pulses corresponding to the number of lamps 19 lit in the dialing operation corresponding to the pulses fed to the telephone line in dialing the standard telephone in calling the number of another telephone in the system. The motor also controls a shunting switch 90 connected to the telephone net, which shunts out the tube-to-line transformer 50 and therefore the loud speaker and its amplifier during the dialing operation so that the pulses are not transmitted to the speaker.

Figures 19, 20, 21, 22:
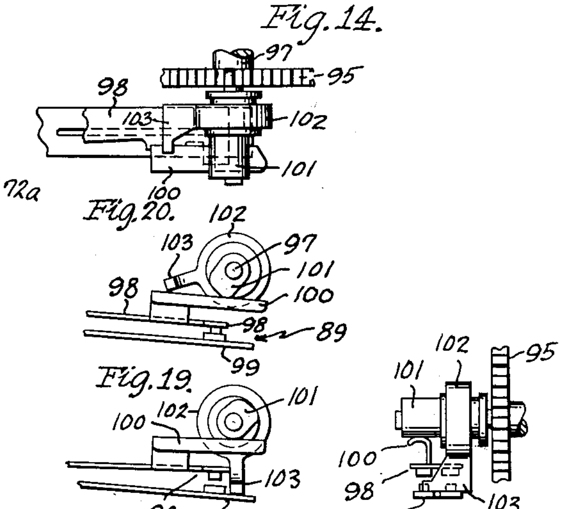
Fig. 19 is an elevational view of the pulsing switch showing the parts in the position they have during the first part of the dialing operation.
Fig. 20 is a top plan view thereof.
Fig. 21 is a view similar to Fig. 19 showing the position of the parts during the second half of the dialing operation and while the pulses are being transmitted to the telephone line.
Fig. 22 is a view looking from the right of Fig. 21.

Gear train 82 is mounted on the opposite side of plate 72*a from* the insulating plate 72 and comprises a pinion 91 (Fig. 13) on the armature shaft of the motor 80 meshing with a gear 92 which has secured to it a pinion 93 meshing with another gear 94 which operates the shaft 81 carrying the movable contact 76. Gear 92 also meshes with a gear 95 operating a shaft 97 on which is a control means for the pulsing switch 89. This pulsing switch 89 comprises the upper spring contact 98 and lower spring contact 99, the lower spring contact 99, as shown in Figs. 19 to 22, normally tending to move to the closed position of Fig. 19. On the upper contact 98 is an extension 100 under an eccentric cam 101 on the shaft 97, and an insulating ring 102 is frictionally mounted on the shaft and has a laterally extending lug 103. As member 102 is frictionally mounted on the shaft it may turn therewith under certain conditions and also may be held stationary while the shaft continues to turn. In its normal retracted position this switch is held open by the lug 103 engaging the lower switch member 99 and holding it separated from the upper contact 98, as shown in Fig. 21. When the motor 80 starts on its forward movement during the dialing operation the member 102 rotates with the shaft 97 from the position of Fig. 21 to the position of Figs. 19 and 20 with this lug 103 resting on top of the member 100. This releases the lower switch contact 99 so that it engages the upper contact 98 and closes this switch. On the reverse movement of the dialing operation the member 102 is carried by friction to the position of Figs. 21 and 22 with the lug 103 resting on top of the lower contact 99, this movement being limited by lug 103 engaging the free end of the upper contact 98. Then continued movement of the shaft 97 in the clockwise or reverse direction will rotate with it the eccentric ram 101, and this cam engages the top of the extension 100 to once every revolution shift the upper contact 98 downwardly into engagement with the lower contact 99 to feed separate pulses to the telephone line for calling another telephone in the system. During this operation the lower contact 99 is retained in its lower position of Fig. 21 by the lug 103 to thus permit the upper contact 98 to be moved to and from engagement with this lower contact under control of the cam 101.

Figures 15, 16, 17, 18:
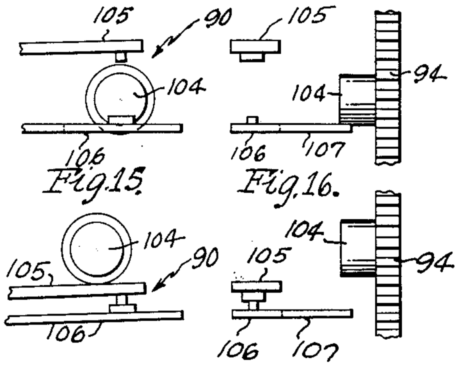
Fig. 15 is a detail of the operating means for the shunt switch showing it in the normal retracted position with the switch open.
Fig. 16 is a view looking from the right of Fig. 15.
Fig. 17 is a view similar to Fig. 15 showng the switch closed.
Fig. 18 is a view looking from the right of Fig. 17.
Figure 13:
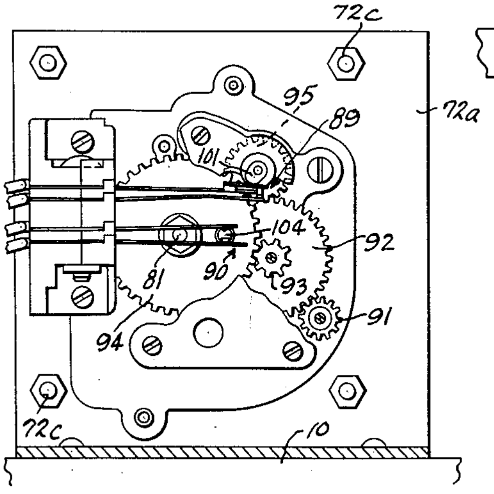
Fig. 13 is a rear view.

The shunting switch 90 is controlled by a pin 104 extending laterally from the surface of the gear 94, and its operation is shown more clearly in Figs. 15 to 18. The switch 90 comprises the upper stationary contact 105 and the lower spring contact 106, which tends to move into engagement with the upper contact, as shown in Figs. 17 and 18. The lower contact has a lateral extension 107 in the path of movement of the lug or pin 104 in its reverse movement. When the dialing mechanism is in its normal or retracted position the pin or lug 104 engages the top of the extension 107, as shown in Figs. 15 and 16, to shift the lower switch 106 downwardly away from the upper contact 105, to thus open this switch. On the first movements of the dialing operation, the gear 94 moves counterclockwise, as shown in Fig. 13, thus carrying the lug 104 upwardly away from the lower contact 106, as shown in Figs. 17 and 18. This permits the lower contact 106 to move upwardly to its closed position in engagement with the upper contact 105, thus shunting out the dialing operation and the signal pulses created thereby from the loud speaker 14 and its amplifier. When the pulsing mechanism returns to its normal retracted position pin 104 again engages the extension 107 on lower contact 106, shifting this control away from the upper contact 105 to open the shunt circuit.

*Operation*

The operation is as follows: When a calling party wishes to call the handicapped person using this device, he will dial his telephone in the usual manner, which will operate the calling bell of the telephone receiver box to which this device is connected by the plug-in connection *49a*, this device being in effect an extension telephone. The handicapped person will then close the control switch 46, which, operating through the relay 25 and switch 26, will connect the transmitter and the receiver into the telephone line. This is equivalent to lifting the transmitter and receiver of the standard telephone in receiving a call. The calling person and the handicapped receiving person may now carry on their conversation, the handicapped person speaking into the transmitter 20 and receiving the voice of the calling person through the loud speaker 14. After the conversation is completed, the handicapped person may again close the switch 46, which through the relay 25 and switch 26, will disconnect the transmitter and the receiver from the telephone line, this action corresponding to the action of hanging up the transmitter and reecviver at the end of a telephone conversation on the standard telephone.

If the handicapped person wishes to call another person, he first operates the switch 46, which will operate the relay 25 and switch 26 to connect the transmitter 20 and the receiver 14 in the telephone line, which, as indicated above, is the equivalent of lifting the standard receiver and transmitter in the standard telephone preparatory to dialing another telephone. The handicapped person now may dial the other phone by operation of the control switch 108. Closing of this switch will actuate the relay 84, coil 109 of which is connected to the secondary of the power transformer through the leads 110 and 111. This operates the double-pole double-throw switch 84a, shifting its contact 112 from engagement with the contact 113 to engagement with the contact 114, and its other contact 115 from engagement with the contact 116 to engagement with the contact 117. This closes the circuit from the rectifier 83 to the motor 80 through the adjustable speed control 85. This operates the motor 80 which shifts the movable contact 76 of the dialing mechanism forwardly or clockwise as viewed in Figs. 11 and 23, carrying this contact in succession over and into engagement with the separate stationary contacts 73, and as this contact moves over the successive contacts 73 it will light up the series of light bulbs 19, beginning from the lowest number 1, and the operator can follow the light along the row of light bulbs and the lenses 9 which are illuminated thereby. He can thus follow and determine the number of these light bulbs which are lighted in succession, and by keeping the control switch 108 closed for the proper length of time, can light the bulbs in succession up to any number desired, and then by releasing the control switch 108 can arrest further movement of the movable contact 76 and thus limit the number of bulbs 19 and numbered and lettered lenses 9 which will be illuminated. The speed of the motor and therefore the speed at which the lights 19 are lighted may be adjusted by the adjustable speed control rheostat 85 to suit the skill of the person using the device. Thus, if he watches the lights move along the lenses 9 he can stop this movement at any lettered or numbered lens by releasing the control switch 108 to permit it to open. This will permit the relay 84 to operate the double-pole double-throw switch 84a to shift the contact 112 from contact 114 to contact 113, and will shift the contact 115 from contact 117 to contact 116. This will reverse the current in the motor 80 so that its forward motion and forward motion of contact 76 is arrested, but as it closes the circuit comprising the speed control 86 and limit switch 87 the motor will immediately start rotating in the opposite or reverse direction, carrying with it the movable contact 76 in the opposite or reverse direction. The speed of this reverse movement is controlled by the resistor 86 to correspond with the speed of the reverse or pulsing movement of the dial of a standard telephone.

As the contact 76 started to rotate in the forward direction, it released the limit switch 87, permitting it to close preparatory to this current-reversing operation of the relay switch 84a. Thus control switch 108 through relay 84 and the double-pole double-throw switch 84a controls forward end reverse torque of motor 80. When the relay coil is energized the motor will turn the controls through the series of lights. When it is de-energized the current in the motor is reversed so it will return for performing the pulsing operation.

This pulsing operation is effected by the device of Figs. 19 to 22. As previously indicated, when the motor and the movable contact 76 are in their normal retracted position, the pulsing switch 89 is held open by the lug 103, as shown in Figs. 21 and 22. Immediately on forward movement of the motor in the dialing operation, this lug 103 is swung to the position of Fig. 19 on top of member 100 to permit the switch to close, and it remains closed during the forward movement of the motor and the contact 76 in lighting the series of lamps. Immediately on the start of the reverse movement of the motor, after the desired number of lights have been lit, the lug 103 is again swung to the position of Fig. 21 over the lower contact member 99. This retains the contact 99 in its lower position during the remainder of the reverse movement of the motor and permits the cam 101, as it rotates in the reverse direction, to shift the upper contact 98 alternately into engagement with the contact 99 and separate therefrom on each rotation of the cam 101, thus feeding to the telephone line an impulse on each rotation of the cam 101, and the number of these pulses during reverse movement of the motor to its normally retracted position corresponds with the number of lights 19 and lenses 9 which have been lighted on the forward movement of the motor. This reverse movement corresponds with the reverse and pulsing movement of the standard telephone dial. Also, immediately on start of the forward movement of the motor, the pin or lug 104 of the shunt switch control moves away from the lower member 106 of shunting switch 90, as shown in Figs. 17 and 18, permitting this shunt switch to close, and shunting out the loud speaker or receiver and its amplifier, and the shunt switch remains closed throughout the entire dialing operation, so that the pulses are not fed to the loud speaker. At the end of the reverse movement of the motor at the completion of the dialing operation, this pin 104 again opens the switch 90 to place the receiver in connection with the telephone line.

Thus in calling another person, the handicapped person, after operating the control switch 46 to connect the device in the telephone line, may dial the number of the person desired to be called by means of the control switch 108. Thus, if the number is Edison 3–0365, he will first dial the two letters E and D by holding switch 108 closed while watching the light move along the row of lenses 9 successively to the lens 3 and then releasing the switch to permit the corresponding pulses to be fed into the telephone line by reverse movement of the motor. He then may dial the numbers in the same manner, and this operation will feed the corresponding pulses to the telephone line, the same as would operating the dial on a standard telephone. The control switches may be connected with the device through the detachable plug-in connectors 112 and 113. The control switches 46 and 108 may be any type of switch desired and found applicable, such, for example, as either the spring switch, as shown, or microswitches, preferably of the type which are closed by the operator and will automatically open when released. They may be positioned at any desired location for operation by the movable parts of the handicapped person. Thus in a known case, for example, where the person is paralyzed except for a limited movement of the toes, switch 46 may be located for operation by movement of the toes of one foot and the other switch 108 located for operation by the toes of the other foot.

This device, as will be clear from the above, permits a handicapped person to carry on telephone conversations with other persons in the conduct of a business or medical practice, for example, without relying on third persons to perform the necessary operations, including dialing, required for use of the telephone.

Having thus set forth the nature of my invention, I claim:

1. In a telephone operating device for handicapped persons, a transmitter and a receiver, a telephone dialing mechanism including a pulsing switch, an indicator including a series of electric lights numbered to correspond with the numbers of the standard telephone dialing system, means for operating said lights in succession including a series of stationary contacts connected to the respective lights and a movable contact mounted to engage the stationary contacts in succession, a motor, driving means from the motor for operating the pulsing switch to provide a series of electric pulses and to shift the movable contact over the stationary contacts to light the lights in succession, and control switches operable by moving parts of the person's body, one operable to connect the transmitter, receiver and pulsing switch into a telephone line and another operable to control operation of the motor to operate the pulsing switch and shift said movable contact.

2. A telephone operating device for handicapped persons according to claim 1, in which the motor is a reversible motor operable in a forward direction under control of its control switch to operate the movable contact to light the lights in succession and the motor is also operable in the opposite direction to operate the pulsing switch to supply pulses to the telephone line to correspond with the number of lights operated by the movable contact.

3. In a telephone operating device for handicapped persons, a transmitter and a receiver, a telephone dialing mechanism including a pulsing switch, an indicator including a series of electric lights numbered to correspond with the numbers of the standard telephone dialing system, means for operating said lights in succession including a series of stationary contacts connected to the respective lights and a movable contact to engage the stationary contacts in succession, a reversible motor for operating the pulsing switch and the movable contact, connections from a source of current supply to the motor for operating it in either direction, a relay including a double-pole double-throw switch in said connection connected to operate the motor in a forward direction when the relay is energized and in the reverse direction when de-energized, means connecting said motor to the movable contact for operation thereby on forward movement of the motor, means connecting the motor with the pulsing switch for operation thereby on reverse movement of the motor, and control switches operable by movable parts of the person's body including a switch to connect the transmitter, receiver and pulsing switch to a telephone line and another switch for controlling operation of the relay.

4. A telephone operating device for handicapped persons according to claim 3 in which there is a shunt switch operated by the motor to shunt the pulses from the receiver during the dialing operation.

5. In a telephone operating device for handicapped persons, a transmitter, a receiver including a loud speaker and an amplifier therefor, a dialing mechanism including a pulsing switch, an indicator including a series of electric lights marked to correspond with the dial characters of a standard telephone dialing system, means for operating said lights in succession including a series of stationary contacts connected to the respective lights and a movable contact to engage the stationary contacts in succession, a reversible motor, means operated by movement of the motor in a forward direction to operate said movable contact to light the lights in succession, means operable by movement of the motor in the reverse direction to operate the pulsing switch to correspond with the number of lights lit on forward movement of the motor, and control switches operable by movable parts of the person's body including a switch operable to connect the transmitter, receiver and pulsing switch to a telephone line, and another switch operable to control the direction of operation of the motor.

6. In a telephone operative device for handicapped persons, a transmitter and a receiver, a telephone dialing mechanism including a switch for supplying to a telephone line a plurality of series of electric pulses corresponding to the units of a telephone calling number, a visual means for indicating the number of pulses to be supplied to the line, a motor for operating the dialing mechanism and the indicating means, control switches operable by movable parts of the person's body including a switch operable to connect the transmitter, receiver and dialing mechanism with a telephone line and another switch controlling the operation of the motor, and a shunt switch operated by the motor to shunt the pulses from the receiver during the dialing operation.

References Cited in the file of this patent

UNITED STATES PATENTS

| | | |
|---|---|---|
| 2,576,189 | Olliver | Nov. 27, 1951 |
| 2,742,971 | Holmes | Apr. 24, 1956 |

UNITED STATES PATENT OFFICE

CERTIFICATION OF CORRECTION

Patent No. 2,976,370 March 21, 1961

Edward T. Duncan

It is hereby certified that error appears in the above numbered patent requiring correction and that the said Letters Patent should read as corrected below.

In the grant, lines 2 and 12, name of assignee, for "Harvey Hubbel, Incorporated", each occurrence, read -- Harvey Hubbell, Incorporated --; in the heading to the printed specification, lines 4 and 5, for "Harvey Hubbel, Incorporated" read -- Harvey Hubbell, Incorporated --.

Signed and sealed this 15th day of August 1961.

(SEAL)
Attest:

ERNEST W. SWIDER
Attesting Officer

DAVID L. LADD
Commissioner of Patents